(12) United States Patent
Yang et al.

(10) Patent No.: US 11,238,634 B2
(45) Date of Patent: Feb. 1, 2022

(54) MOTION MODEL REFINEMENT BASED ON CONTACT ANALYSIS AND OPTIMIZATION

(71) Applicant: Adobe Inc., San Jose, CA (US)

(72) Inventors: Jimei Yang, Mountain View, CA (US); Davis Rempe, Menlo Park, CA (US); Bryan Russell, San Francisco, CA (US); Aaron Hertzmann, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/860,411

(22) Filed: Apr. 28, 2020

(65) Prior Publication Data

US 2021/0335028 A1 Oct. 28, 2021

(51) Int. Cl.
| | |
|---|---|
| *G06T 13/40* | (2011.01) |
| *G06T 15/20* | (2011.01) |
| *G06T 15/50* | (2011.01) |
| *G06N 3/08* | (2006.01) |

(52) U.S. Cl.
CPC ............. *G06T 13/40* (2013.01); *G06N 3/08* (2013.01); *G06T 15/20* (2013.01); *G06T 15/50* (2013.01)

(58) Field of Classification Search
CPC ......... G06T 13/40; G06T 15/20; G06T 15/50; G06N 3/08
See application file for complete search history.

(56) References Cited

U.S. PATENT DOCUMENTS

2020/0151559 A1* 5/2020 Karras ................... G06N 3/088

OTHER PUBLICATIONS

3. Zou et al. (Zou et al., "Reducing Footskate in Human Motion Reconstruction with Ground Contact Constraints", Computer Vision Foundation, 2020, pp. 259-468). (Year: 2020).*
Bogo et al., Keep it SMPL: Automatic Estimation of 3D Human Pose and Shape from a Single Image, Computer Vision—European Conference on Computer Vision 2016, Oct. 2016, 18 pages.
Brubaker et al., Estimating Contact Dynamics, Proceedings of IEEE International Conference on Computer Vision, Sep. 2009, 8 pages.

(Continued)

*Primary Examiner* — William A Beutel
(74) *Attorney, Agent, or Firm* — Kilpatrick Townsend & Stockton LLP

(57) ABSTRACT

In some embodiments, a motion model refinement system receives an input video depicting a human character and an initial motion model describing motions of individual joint points of the human character in a three-dimensional space. The motion model refinement system identifies foot joint points of the human character that are in contact with a ground plane using a trained contact estimation model. The motion model refinement system determines the ground plane based on the foot joint points and the initial motion model and constructs an optimization problem for refining the initial motion model. The optimization problem minimizes the difference between the refined motion model and the initial motion model under a set of plausibility constraints including constraints on the contact foot joint points and a time-dependent inertia tensor-based constraint. The motion model refinement system obtains the refined motion model by solving the optimization problem.

20 Claims, 8 Drawing Sheets

(56) References Cited

OTHER PUBLICATIONS

Brubaker et al., Physics-based Person Tracking using the Anthropomorphic Walker, International Journal of Computer Vision, vol. 87, No. 1, Aug. 6, 2009, pp. 140-155.

Callennec et al., Robust Kinematic Constraint Detection for Motion Data, Proceedings of the 2006 ACM SIGGRAPH / Eurographics Symposium on Computer Animation, SCA '06, Sep. 2006, pp. 281-290.

Cao et al., OpenPose: Realtime Multi-person 2D Pose Estimation Using Part Affinity Fields, arXiv preprint arXiv:1812.08008, Available Online at: https://arxiv.org/abs/1812.08008, 2018, 14 pages.

Chen et al., Holistic++ Scene Understanding: Single-view 3D Holistic Scene Parsing and Human Pose Estimation with Human-object Interaction and Physical Commonsense, Proceedings of the IEEE International Conference on Computer Vision, 2019, 10 pages.

Fang et al., Efficient Synthesis of Physically Valid Human Motion, ACM Transactions on Graphics, vol. 22, No. 3, Jul. 2003, pp. 417-426.

Forsyth et al., Computational Studies of Human Motion: Part 1, Tracking and Motion Synthesis, Foundations and Trends in Computer Graphics and Vision, vol. 1, No. 2-3, Aug. 28, 2006, pp. 77-254.

Gleicher, Retargetting Motion to New Characters, Proceedings of the 25th Annual Conference on Computer Graphics and Interactive Techniques SIGGRAPH '98, Jul. 1998, pp. 33-42.

Hassan et al.. Resolving 3D Human Pose Ambiguities with 3D Scene Constraints, Proceedings of IEEE International Conference on Computer Vision (ICCV), Aug. 20, 2019, 18 pages.

He et al., Mask R-CNN, Proceedings of the IEEE International Conference on Computer Vision, Jan. 24, 2018, 12 pages.

Herr et al., Angular Momentum in Human Walking, Journal of Experimental Biology, vol. 211, Feb. 2008, pp. 467-481.

Hoyet et al., Push it Real: Perceiving Causality in Virtual Interactions, ACM Transactions on Graphics, vol. 31, No. 4, Jul. 2012, pp. 90:1-90:9.

Ikemoto et al., Knowing When to Put Your Foot Down, Proceedings of the 2006 Symposium on Interactive 3D Graphics and Games, Mar. 14-17, 2006, pp. 49-53.

Jiang et al., Synthesis of Biologically Realistic Human Motion Using Joint Torque Actuation, ACM Transactions on Graphics, vol. 38, No. 4, Jul. 2019, 12 pages.

Kanazawa et al., End-to-end Recovery of Human Shape and Pose, Computer Vision and Pattern Recognition (CVPR), Jun. 23, 2018, 10 pages.

Kanazawa et al., Learning 3D Human Dynamics from Video, In Computer Vision and Pattern Recognition (CVPR), Sep. 16, 2019, 12 pages.

Kulig et al., Ground Reaction Forces and Knee Mechanics in the Weight Acceptance Phase of a Dance Leap Take-off and Landing, Journal of Sports Sciences, vol. 29, No. 2, Jan. 15, 2011, pp. 125-131.

Lasa et al., Feature-based Locomotion Controllers, Association of Computing Machinery's Special Interest Group on Computer Graphics and Interactive Techniques, vol. 29, No. 4, Jul. 2010, 10 pages.

Leva, Adjustments to Zatsiorsky-seluyanov's Segment Inertia Parameters, Journal of Biomechanics, vol. 29, No. 9, Sep. 1996, pp. 1223-1230.

Li et al., Estimating 3D Motion and Forces of Person-object Interactions from Monocular Video, The IEEE Conference on Computer Vision and Pattern Recognition (CVPR), Jun. 17, 2019, pp. 8640-8649.

Liu et al., Learning Physics-Based Motion Style with Nonlinear Inverse Optimization, In ACM Transactions on Graphics, vol. 24, No. 3, Jul. 2005, pp. 1071-1081.

Macchietto et al., Momentum Control for Balance, Association for Computing Machinery's Special Interest Group on Computer Graphics 2009 Papers (ACM SIGGRAPH), Jul. 2009, 8 pages.

Mehta et al., Vnect: Real-time 3D Human Pose Estimation with a Single RGB Camera, ACM Transactions on Graphics, vol. 36, No. 4, Jul. 2017, pp. 44.1-44.14.

Newell et al., Stacked Hourglass Networks for Human Pose Estimation, European Conference on Computer Vision, Jul. 26, 2016, pp. 483-499.

Paszke et al., Automatic Differentiation in PyTorch, 31st Conference on Neural Information Processing Systems (NIPS 2017), 2017, 4 pages.

Pavlakos et al., Expressive Body Capture: 3D Hands, Face, and Body from a Single Image, In Proceedings IEEE Conference on Computer Vision and Pattern Recognition (CVPR), Apr. 11, 2019, 22 pages.

Peng et al., SFV: Reinforcement Learning of Physical Skills from Videos, ACM Transactions on Graphics, vol. 37, No. 6, Dec. 2018, pp. 178:1-178:14.

Popovic et al., Physically Based Motion Transformation, Proceedings of the 26th annual conference on Computer graphics and interactive techniques (SIGGRAPH '99), Aug. 8-13, 1999, pp. 11-20.

Reitsma et al., Perceptual Metrics for Character Animation: Sensitivity to Errors in Ballistic Motion, ACM Transactions on Graphics, vol. 22, No. 3, Jul. 2003, pp. 537-542.

Robertson et al., Research Methods in Biomechanics, Human Kinetics, 2004, 11 pages.

Safonova et al., Synthesizing Physically Realistic Human Motion in Low-dimensional, Behavior-Specific Spaces, Association for Computing Machinery's Special Interest Group on Computer Graphics 2009 Papers (ACM SIGGRAPH) 2004 Papers, Aug. 2004, pp. 514-521.

Vondrak et al., Video-based 3D Motion Capture Through Biped Control, ACM Transactions on Graphics, vol. 31, No. 4, Jul. 2012, 12 pages.

Wachter et al., On the Implementation of a Primal-dual Interior Point Filter Line Search Algorithm for Large-scale Nonlinear Programming, Mathematical Programming, vol. 106, No. 1, Apr. 28, 2005, pp. 25-57.

Wang et al., Optimizing Locomotion Controllers Using Biologically-based Actuators and Objectives, ACM Transactions on Graphics, vol. 31, No. 4, Jul. 2012, pp. 25.1-25.11.

Wei et al., Videomocap: Modeling Physically Realistic Human Motion from Monocular Video Sequences, Association for Computing Machinery's Special Interest Group on Computer Graphics 2009 Papers (ACM SIGGRAPH) 2010 Papers, vol. 29, No. 4, Jul. 2010, pp. 42:1-42:10.

Winkler, Gait and Trajectory Optimization for Legged Systems Through Phase-based End-Effector Parameterization, IEEE Robotics and Automation Letters (RA-L), vol. 3, No. 3, Jul. 2018, pp. 1560-1567.

Xiang et al., Monocular Total Capture: Posing Face, Body, and Hands in the Wild, The IEEE Conference on Computer Vision and Pattern Recognition (CVPR), Dec. 4, 2018, 17 pages.

Xu et al., Monoperfcap: Human Performance Capture from Monocular Video, ACM Transactions on Graphics, vol. 37, No. 2, May 2018, pp. 27:1-27:15.

Zanfir et al., Monocular 3D Pose and Shape Estimation of Multiple People in Natural Scenes—the Importance of Multiple Scene Constraints, In Proceedings of the IEEE Conference on Computer Vision and Pattern Recognition, 2018, pp. 2148-2157.

Zou et al., Reducing Footskate in Human Motion Reconstruction with Ground Contact Constraints, Computer Vision Foundation, 2020, pp. 459-468.

* cited by examiner

MOTION MODEL REFINEMENT BASED ON CONTACT ANALYSIS AND OPTIMIZATION

TECHNICAL FIELD

This disclosure relates generally to computer-implemented methods and systems for computer graphics processing. Specifically, the present disclosure involves refining character motion estimation from video sequences based on analysis on contacts of joint points of a character with a ground plane and further based on solving a physics-based optimization problem for a physically-plausible motion model of the character.

BACKGROUND

Developments in computer vision technologies allow a character's motions to be estimated from a video sequence containing the character. The extracted motions can be applied in various applications such as understanding the content of the video and to infer actions, intentions, or emotions of characters. The extracted motions can also be utilized in computer animations by retargeting extraction motions to a computer-generated character. However, existing methods of motion extraction often generate unsatisfactory results showing motions that are visually and physically plausible. Motions estimated by these methods include errors such as feet floating above the ground or penetrating the ground, and implausible forward or backward body lean.

SUMMARY

Certain embodiments involve motion model refinement based on contact analysis and physics-based optimization. In one example, a motion model refinement system determines contact joint points for a human character contained in a sequence of video frames using a trained contact estimation model. The contact joint points are determined by the trained contact estimation model as being in contact with a ground plane. The motion model refinement system further determines the ground plane in a three-dimensional space defined by an initial motion model of the human character. The initial motion model of the human character is estimated from the sequence of video frames and describes motions of joint points of the human character in the three-dimensional space. Determining the ground plane is based on the contact joint points and the initial motion model. The motion model refinement system further determines a refined motion model over the initial motion model by performing an optimization under a set of constraints. The set of constraints are defined based on the initial motion model, the determined ground plane, and the contact joint points. The refined motion model can be applied on a target computer-generated character to generate a computer-animated character.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
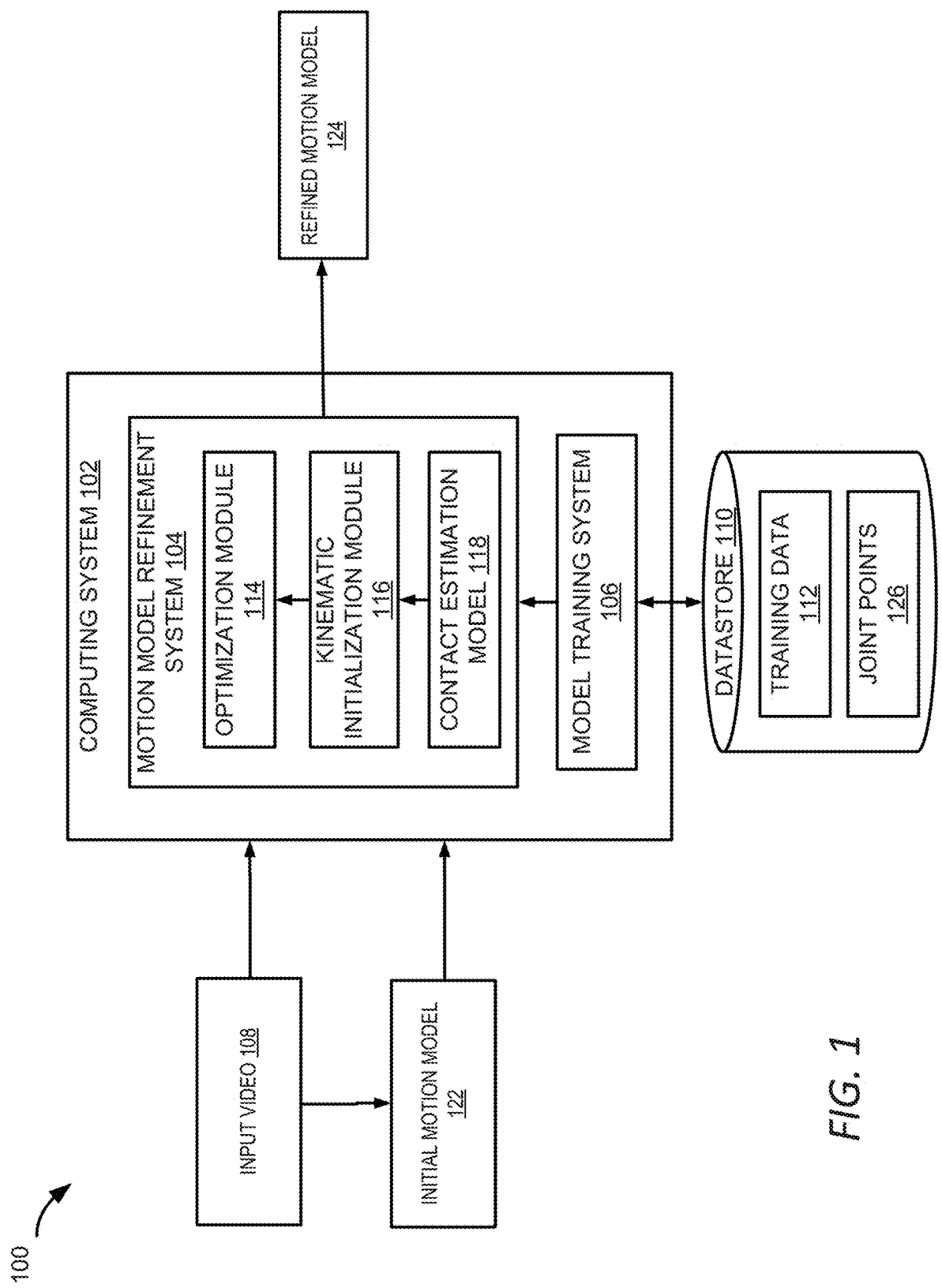
FIG. 1 depicts an example of a computing environment for motion model refinement based on contact analysis and physics-based optimization, according to certain embodiments of the present disclosure.

The present disclosure involves motion model refinement based on contact analysis and physics-based optimization. As discussed above, existing motion estimation methods often generate visually and physically implausible motion models involving feet's contact with the ground and other physical movements such as forward or backward body lean. Certain embodiments described herein address these limitations by refining the motion models based on estimating contact joint points (i.e., joint points that are in contact with a ground plane) and a physics-based optimization process. For instance, a motion model refinement system determines contact joint points for a character in a sequence of video frames that are in contact with a ground plane using a trained contact estimation model. Based on the contact joint points, the motion model refinement system further determines the ground plane in the three-dimensional space of an initial motion model of the character. The motion model refinement system further generates a refined motion model based on the initial motion model by performing an optimization under a set of constraints enforcing plausibility of the motion. These constraints can be defined based on at least the determined ground plane and the contact joint points.

The following non-limiting example is provided to introduce certain embodiments. In this example, a motion model refinement system obtains a sequence of video frames depicting a character and an initial motion model of the character extracted from the sequence of video frames. The initial motion model can be extracted using existing pose estimation methods and can include multiple joint points of the character and their respective motions in a three-dimensional space. For example, the joint points of a human character can include, for example, joint points representing human joints such as the head, neck, shoulder, elbows, hip, knees, toes, heels, hands, wrists, etc. The joint points associated with feet of the character are referred to as foot joint points, such as the joint points on the right toe, right heel, left toe, and left heel. The human character used herein refers to a character with the appearance of a human.

The motion model refinement system further employs a trained contact estimation model to determine foot joint points in a video frame that are in contact with a ground plane, also referred to herein as "contact foot joint points." For example, if, in a video frame, a character is standing on his right foot with his left foot lifted, contact foot joint points of the character can include the joint points of the right foot, such as the joint points for the right toe and right heel. The non-contact foot joints include the joint points for the left toe and left heel. The contact estimation model can be configured to determine the contact foot joint points of a character in a target video frame based on the locations of joint points of the character in frames surrounding the target video frame. The output of the contact estimation model can include a contact label for each foot joint point indicating whether the respective joint points are in contact with the ground. The contact foot joint points can be utilized to generate constraints for the motion model so that the determined motions for the contact joint points and non-contact joint points are realistic.

Based on the contact foot joint points, the motion model refinement system determines the ground plane in the three-dimensional space of the initial motion model and smooths the motions in the motion model along the time dimension. The motion model refinement system further determines the plausibility constraints for the motion model. The plausibility constraints include constraints enforcing valid rigid mechanics including linear and angular momentum, constraints enforcing foot contact, constraints maintaining constant foot length and leg length. The motion model refinement system determines the refined motion model by solving an optimization problem that keeps the motion and contacts of the refined motion model to the initial motion model as close as possible while satisfying the plausibility constraints.

The refined motion model can be utilized in various applications. For example, the refined motion model can be utilized in computer animations by applying the refined motion model on a target computer-generated character. The refined motion model can also be utilized to analyze and understand the content of the input video, such as to infer actions, intentions, or emotions of the character in the input video.

As described herein, certain embodiments provide improvements in computer vision and video processing by refining a motion model of a character extracted from a sequence of video frames. The refinement process enforces the refined motion model to satisfy motion plausibility constraints so that the motion model of the character is visually and physically plausible. The refined motion model thus improves the accuracy of the extracted motion model. Consequently, further analysis based on the refined motion model is more accurate and motions of the computer-generated character to which the refined motion model is applied are more realistic.

Example Operating Environment for Motion Model Refinement

Referring now to the drawings, FIG. 1 depicts an example of a computing environment 100 for refining a motion model of a character estimated from an input video 108. The computing environment 100 includes a computing system 102, which can include one or more processing devices that execute a motion model refinement system 104 to perform motion model refinement and a model training system 106 for training a contact estimation model 118 used during the motion model refinement. The computing environment 100 further includes a datastore 110 for storing data used in the motion model refinement, such as the joint points 126 extracted from the input video 108, training data 112 used by the model training system 106 to train the contact estimation model 118.

The motion model refinement system 104 can receive an input video 108 that includes a sequence of video frames depicting a human character. It should be noted that the sequence of video frames may contain multiple characters and the motion model refinement described below can be applied to each character in a similar way. For simplicity, the following description focuses on one human character contained in the sequence of video frames in the input video 108.

The motion model refinement system 104 can further receive an initial motion model 122 of the human character in the input video 108. The initial motion model 122 can be determined using an existing human pose estimation method. The initial motion model 122 can include multiple joint points of the human character and their respective motions in a three-dimensional space. The joint points of the human character can include, for example, joint points representing human joints such as the head, neck, shoulder, elbows, hip, knees, toes, heels, hands, wrists, etc. The joint points associated with feet of the character are referred to as foot joint points, such as the joint points on the right toe, right heel, left toe, and left heel.

To refine the initial motion model 122, the motion model refinement system 104 can employ a contact estimation model 118, a kinematic initialization module 116, and an optimization module 114. The contact estimation model 118 can be configured to estimate contact foot joint points in a video frame based on the joint points 126 of the character in the sequence of video frames. Contact foot joint points refer to the joint points on the foot of the human character that are in contact with the ground. As will be discussed in detail below, the joint points of the character used for estimating the contact foot joint points can include a portion of the joint points 126 of the character, such as the joint points on the lower body of the character. The joint points 126 of the character in the input video 108 can be pre-generated, based on the input video 108, by an external system or by the motion model refinement system 104 and be stored in the datastore 110.

In one example, the contact estimation model 118 can include a machine learning model, such as a neural network, configured to accept joint points of the character as inputs. The output of the machine learning model can contain a label for each of the foot joint points in a target video frame indicating whether the corresponding foot joint point is in contact with the ground or not. To obtain the contact estimation model 118, the computing system 102 can employ a model training system 106 to build and train the contact estimation model 118. Training the contact estimation model 118 can include generating training data 112 for the model. The training data 112 can include training samples each including an input and an output. The input in a training sample can include a vector containing the positions of the joint points of the character in the target video frame. In some examples, the vector can also include positions of joint points of the character in the surrounding video frames of the target video frame. The output can include the contact label for each of the foot joint points in the target frame. The training process can further involve adjusting the parameters of the contact estimation model 118 so that a loss function calculated based on the outputs of the contact estimation model 118 is minimized. Detailed examples of training and utilizing the contact estimation model 118 are described herein with respect to FIGS. 2-6.

The motion model refinement system 104 can further employ the kinematic initialization module 116 to determine a ground plane in the three-dimensional space of the initial motion model 122 based on the contact foot joint points. The kinematic initialization module 116 can further process the initial motion model 122 by smoothing the motions of the joint points along the time dimension. Additional details regarding the kinematic initialization module 116 are provided below with regard to FIGS. 2-4.

The refined motion model 124 for the character in the input video 108 can be generated by the motion model refinement system 104 through solving an optimization problem under a set of plausibility constraints enforcing plausibility of the motions of the joint points. The plausibility constraints can include constraints enforcing valid rigid mechanics including linear and angular momentum, constraints enforcing foot contact, constraints maintaining constant foot length and leg length, and other constraints. Under these constraints, the motion model refinement system 104 determines the refined motion model 124 by solving the optimization problem to keep the motions and contacts of the refined motion model 124 to that of the initial motion model 122 as close as possible.

The refined motion model can be utilized in various applications. For example, the refined motion model can be utilized in computer animations by applying the refined motion model on a target computer-generated character. The refined motion model can also be utilized to analyze and understand the content of the input video, such as to infer actions, intentions, or emotions of the character in the input video. Additional details regarding determining the refined motion model 124 are described below with respect to FIGS. 2-5.

Examples of Computer-Implemented Operations for Motion Model Refinement

Figure 2:
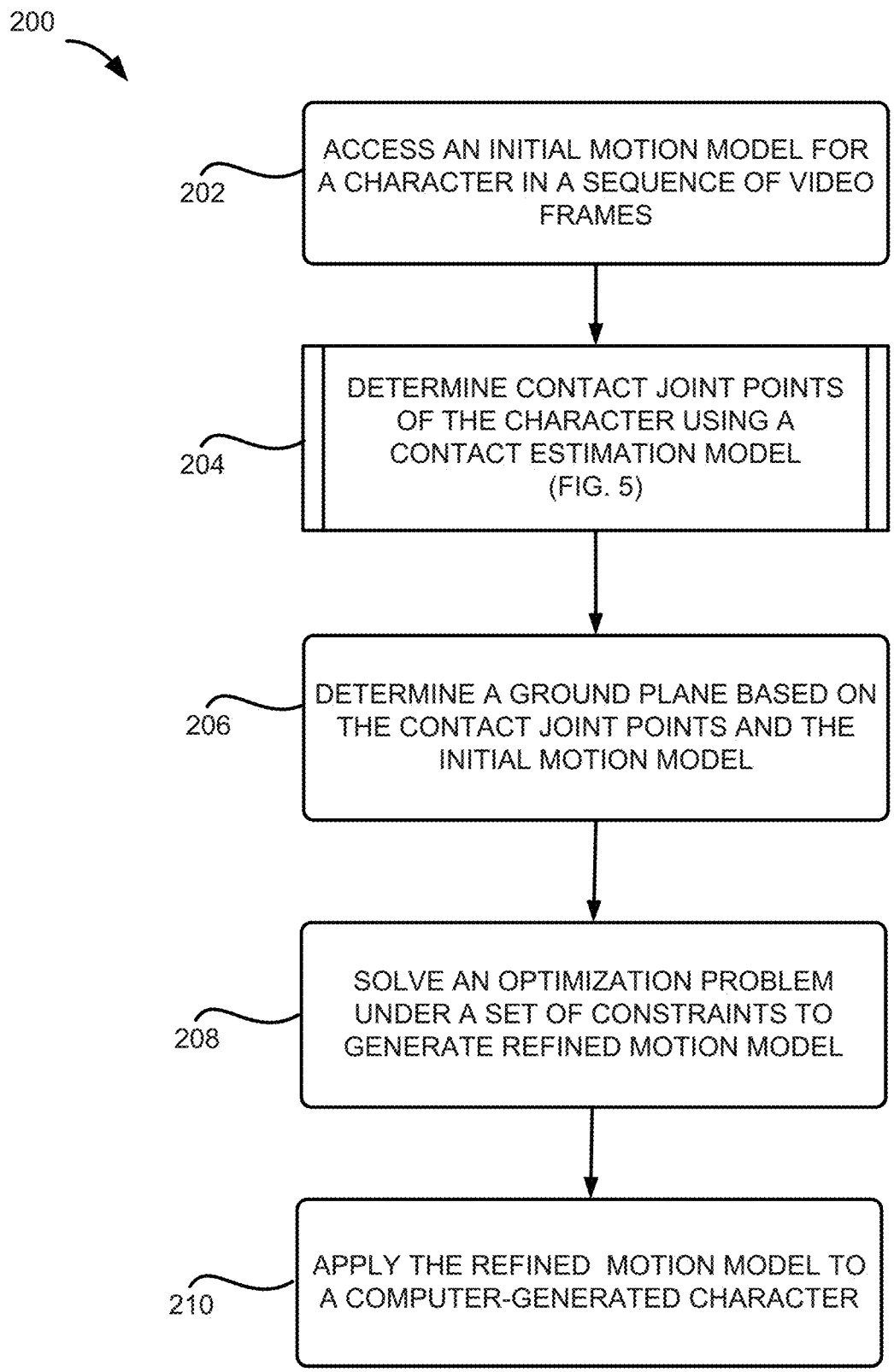
FIG. 2 depicts an example of a process for refining a motion model for computer animation based on contact analysis and physics-based optimization, according to certain embodiments of the present disclosure.

FIG. 2 depicts an example of a process 200 for refining a motion model based on contact analysis and physics-based optimization and applying the refined motion model on a computer-generated character, according to certain embodiments of the present disclosure. It should be noted that in the example of the process 200 shown in FIG. 2, the contact estimation model 118 used for estimating the contact foot joint points has been already been trained. Generation of the training data for the contact estimation model 118 and the training thereof are discussed below with respect to FIG. 6. FIG. 2 is described in conjunction with FIG. 3 where an example of the joint points of a human character is shown and in conjunction with FIG. 4 where an example of a block diagram of the software modules used for motion model refinement is depicted. One or more computing devices (e.g., the computing system 102) implement operations depicted in FIG. 2 by executing suitable program code (e.g., the motion model refinement system 104). For illustrative purposes, the process 200 is described with reference to certain examples depicted in the figures. Other implementations, however, are possible.

At block 202, the process 200 involves accessing a sequence of video frames in an input video 108 and an initial motion model 122 of a character contained in the sequence of video frames. As discussed above, the initial motion model 122 can be generated using any existing human pose estimation method that generates a motion model having small absolute differences from the true poses in 3D coordinates but with visual and physical implausibility. In some examples, the initial motion model 122 includes or can be converted to a model describing joint points of the human character and the motions of the respective joint points in a three-dimensional space.

Figure 3:
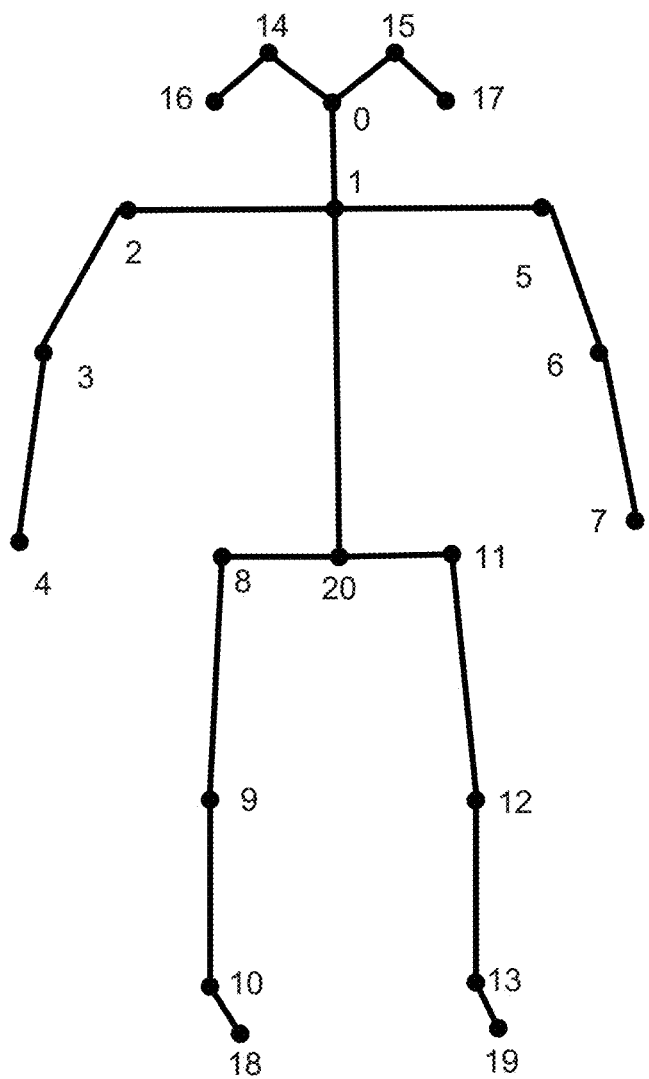
FIG. 3 depicts an example of joint points of a human character, according to certain embodiments of the present disclosure.

FIG. 3 shows an example of a skeleton containing joint points of a human character. In the example shown in FIG. 3, 20 joint points are identified for a human character. The 20 joint points can include: point 0 (nose), point 1 (neck), point 2 (right shoulder), point 3 (right elbow), point 4 (right wrist), point 5 (left shoulder), point 6 (left elbow), point 7 (left wrist), point 8 (right hip), point 9 (right knee), point 10 (right heel), point 11 (left hip), point 12 (left knee), point 13 (left heel), point 14 (right eye), point 15 (left eye), point 16 (right ear), point 17 (left ear), point 18 (right toe), point 19 (left toe), and point 20 (root joint point). The joint points on the feet of the character, such as point 10 (right heel), point 13 (left heel), point 18 (right toe), and point 19 (left toe) can be collectively referred to as "foot joint points." It should be understood that the joint points shown in FIG. 3 are provided by way of illustration only and should not be construed as limiting. Various different joint points of a human character can be extracted to build the motion model. Likewise, the foot joint points of the character may be different from the foot joint points shown in FIG. 3. More or fewer foot joint points may be utilized. For illustration purposes, the following description focus on the example foot joint points shown in FIG. 3.

Referring back to FIG. 2, at block 204, the process 200 involves determining contact joint points of the character (i.e., the joint points that are in contact with the ground) in the sequence of video frames using a contact estimation model 118. In some examples, the process 200 involves determining the foot joint points that are in contact with the ground, referred to as "contact foot joint points." If the foot joint points include the four joint points as shown in FIG. 3 (i.e., left heel point, left toe point, right heel point, right toe point), the contact estimation model 118 can determine, among the four foot joint points, the contact foot joint points and non-contact foot joint points for each video frame in the sequence of video frames.

Figure 4:
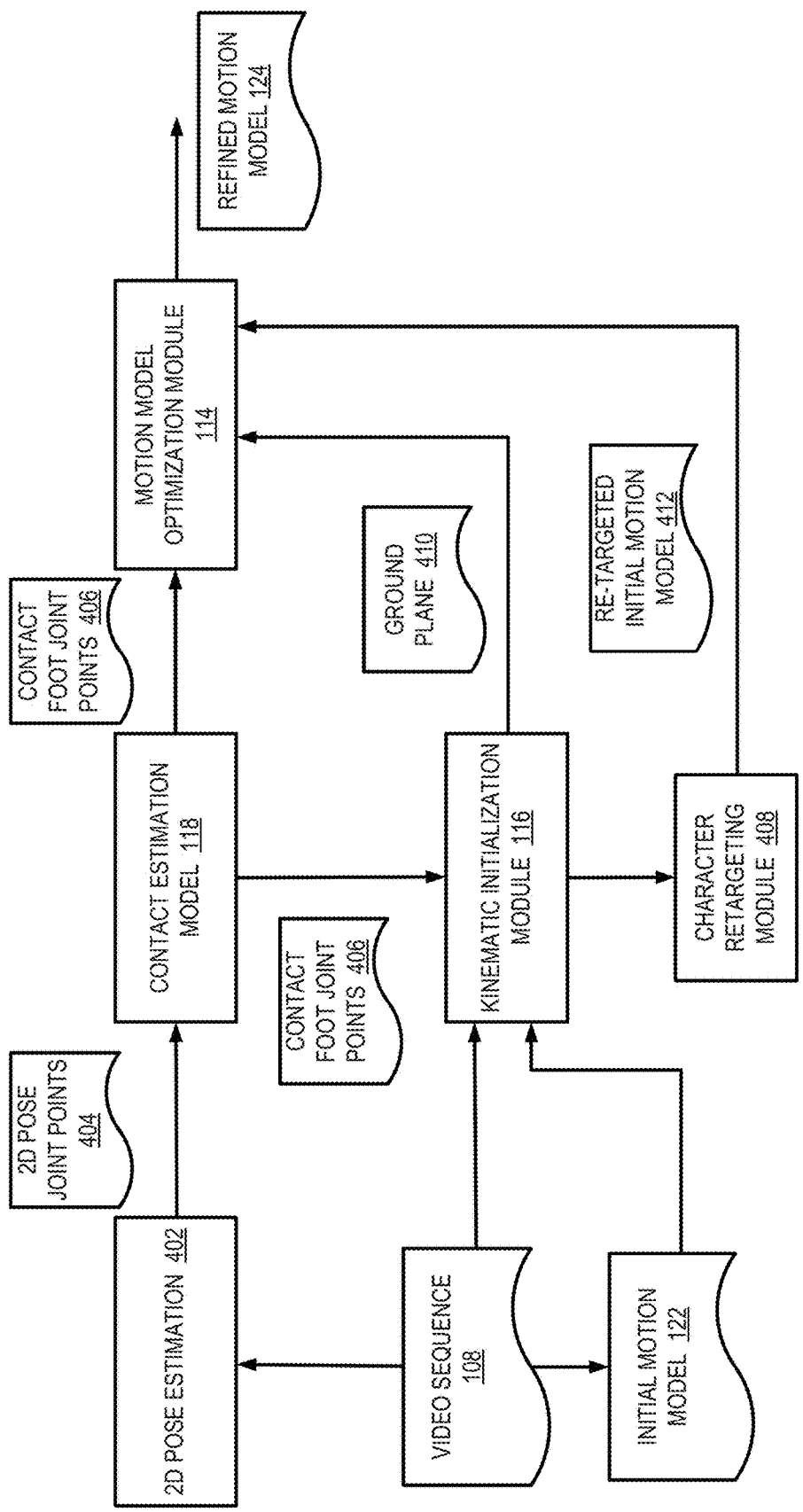
FIG. 4 depicts an example of a block diagram of the various software modules used for motion model refinement, according to certain embodiments of the present disclosure.

FIG. 4 illustrates an example of a block diagram of the motion model refinement system 104. In the example shown in FIG. 4, the motion model refinement system 104 includes a 2D pose estimation module 402, a contact estimation model 118, a kinematic initialization module 116, and a motion model optimization module 114. The 2D pose estimation module 402 can be configured to estimate the joint points 404 of the human character from a single frame, referred to as "2D pose joint points 404." The 2D pose joint points 404 can be the same as or different from the joint points involved in the initial motion model 122. As discussed above, in other implementations, the motion model refinement system 104 may access the joint points 126 pre-generated by another system instead of generating the 2D pose joint points 404 using the 2D pose estimation module 402. The 2D pose joint points 404 (or the joint points 126) can be utilized to generate the input data for the contact estimation model 118 to determine the contact foot joint points 406. Additional details about determining contact foot joint points 406 using the contact estimation model 118 are provided below with respect to FIG. 5.

Referring back to FIG. 2, at block 206, the process 200 involves determining a ground plane based on the contact joint points and the initial motion model 122. In the above the example where the contact joint points are contact foot joint points, the ground plane is determined based on the contact foot joint points 406. In the example shown in FIG. 4, the kinematic initialization module 116 is employed to determine the ground plane 410 based on the contact foot joint points 406. In some implementations, the ground plane 410 can be determined by finding a 2D plane in the 3D space of the initial motion model 122 so that the contact foot joint points are on the 2D plane and the non-contact foot joint points are not on the 2D plane. This 2D plane is the ground plane 410 and can be determined through least-squares algorithms so that the sum of the squares of the distances between the ground plane 410 and contact foot joint points 406 are minimized. For example, an optimization can be first performed so that the feet are stationary but not at a consistent height. Next, a robust regression can be employed to find the ground plane 410 which best fits the positions of the contact foot joint points. This optimization can be continued to ensure all foot joint points are on this ground plane when in contact.

In some examples, the kinematic initialization module 116 further smooths the motions of the initial motion model 122. For instance, the kinematic initialization module 116 can apply a low-pass filter to smooth the motions of the joint points in the initial motion model 122 along the time dimension. The kinematic initialization module 116 can be further configured to determine the initial inputs to the optimization problem as described below with respect to block 208.

As shown in the example of FIG. 4, the motion model refinement system 104 also includes a character retargeting module 408. The character retargeting module 408 applies or transfers the initial motion model 122 (or the smoothed initial motion model 122 if the smoothing is performed in the kinematic initialization module 116) to a target computer-generated character so that the size of the character can be obtained, such as the foot length and leg length of the character. These size values can be used in the motion model optimization procedure described below to generate the refined motion model for the target computer-generated character. The ground plane 410, the smoothed initial motion model 122 or the re-targeted initial motion model 412 are fed into the motion model optimization module 114 for refining the initial motion model 122.

At block 208, the process 200 involves solving an optimization problem under a set of plausibility constraints to generate the refined motion model 124. In the example shown in FIG. 4, the motion model optimization module 114 is employed to solve the optimization problem. In some examples, the optimization is performed on a reduced-dimensional body model that captures overall motion, rotation, and contacts, but avoids the difficulty of optimizing all joint points. Modeling rotation is necessary for important effects like arm swing and counter-oscillations. For example, the reduced-dimensional body model can include the center of mass (COM) of the character and the foot joint points. In these examples, the inputs to the optimization include initial estimates of: COM position $\bar{r}(t) \in R^3$ and orientation $\bar{\theta}(t) \in R^3$ trajectories, body-frame inertia tensor trajectory $I_b(t) \in R^{3 \times 3}$, and trajectories of the foot joint positions $\bar{\theta}_{1:4}(t) \in R^3$. In this example, there are four foot joint points: left toe, left heel, right toe, and right heel, indexed as $i \in \{1, 2, 3, 4\}$. These inputs are at discrete time steps which are written here as functions for clarity. The inputs further include the height of the ground plane 410, hfloor, and the upward normal of the ground plane 410.

These inputs can be obtained by employing the kinematic initialization module 116 to initialize a skeleton containing multiple body joint points (such as the skeleton shown in FIG. 3) from the initial motion model 122. While the motion model optimization problem presented herein focus on the COM position, the full-body motion in the initial motion model 122 is utilized to extract targets for the optimization problem. These targets include the initial COM position and orientation, foot joint positions and contact timings. The objective of the optimization is for the refined motion model to stay as close as possible to these initial targets. The COM position and the inertia tensor trajectories can be computed using a predefined body mass (such as 73 kg) and distribution. The orientation about the root joint point can be used as the COM orientation, and the positions of the foot joint points can be used directly. In some examples, the root joint is a joint close to the pelvis center of a human character, such as the joint 20 in FIG. 3. The root joint can have a position and rotation in the world coordinate frame to achieve a "global" transformation of the human skeleton. Other joints can be described relative to this root joint (i.e. the position is the offset from the root joint, rather than the position in the world coordinate system). As a result, the orientation about the root joint point can be the global rotation attached to the root, which can be used as a rough approximation of the orientation about the COM (since the COM is usually close to the root joint for typical human poses).

Additionally, for each foot joint point at each time (each frame), a binary label is provided indicating whether the foot is in contact with the ground plane 410. These binary labels can be provided as the output of the contact estimation model 118. These labels determine initial estimates of contact durations for each foot joint $\bar{T}_{i,1}, \bar{T}_{i,2}, \ldots, \bar{T}_{i,n_i}$ as described below. The distance from toe to heel $l_{foot}$ and maximum distance from the toe to hip $l_{leg}$ can also be included in the inputs to the optimization problem. These input values can be computed from the input video 108 and be used to both initialize the optimization variables and as targets in the objective function. For $l_{foot}$ and $l_{leg}$, if the re-targeted initial motion model 412 is available, the values can be obtained from this re-targeted initial motion model; otherwise, these values can be set based on the character in the sequence of video frames.

The optimization variables of the optimization problem can include the COM position and Euler angle orientation $r(t)$, $\theta(t) \in R^3$, foot joint point positions $p_i(t) \in R^3$ and contact forces $f_i(t) \in R^3$. These variables can be continuous functions of time, represented by piece-wise cubic polynomials with continuity constraints. The contact timings can also be optimized. The contacts for each foot joint point are independently parameterized by a sequence of phases that alternate between contact and flight (i.e., no contact). The optimizer cannot change the type of each phase (contact or flight), but it can modify their durations $T_{i,1}, T_{i,2}, \ldots, T_{i,n_i} \in R$ where $n_i$ is the number of total contact phases for the i-th foot joint.

In some examples, the optimization problem can be formulated as follows:

$$\min_{r, \theta, p_i, f_i} \sum_{t=0}^{T} (E_{data}(t) + E_{vel}(t) + E_{acc}(t)) + E_{dur}$$

$$s.t. \quad m\ddot{r}(t) = \sum_{i=1}^{4} f_i(t) + mg$$

-continued $$I_w(t)\dot{\omega}(t) + \omega(t) \times I_w(t)\omega(t) = \sum_{i=1}^{4} f_i(t) \times (r(t) - p_i(t)) \quad \text{(dynamics)}$$

$$\dot{r}(0) = \dot{\bar{r}}(0), \dot{r}(T) = \dot{\bar{r}}(T) \quad \text{(velocity boundaries)}$$

$$\|p_1(t) - p_2(t)\| = \|p_3(t) - p_4(t)\| = l_{foot} \quad \text{(foot kinematics)}$$

For every foot joint point i:

$$\|p_1(t) - p_{hip,i}(t)\| \le l_{leg} \quad \text{(leg kinematics)}$$

$$\sum_{j=1}^{n_i} T_{i,j} = T \quad \text{(contact duration)}$$

For foot joint point i in contact at time t:

$\dot{p}_i(t)=0$ (no slip)

$p_i^z(t)=h_{poor}(p_i^{xy})$ (on floor)

$0 \le f_i(t)^T \hat{n} \le f_{max}$ (pushing/max force)

$|f_i(t)^T \hat{t}_{1,2}| < \mu f_i(t)^T \hat{n}$ (friction pyramid)

For foot joint point i in flight at time t:

$p_i^z(t) \ge h_{floor}(p_i^{xy})$ (above floor)

$f_i(t)=0$ (no force in air)

In this example, $E_{data}$ and $E_{dur}$ seek to keep the motion and contacts of the refined motion model 124 as close as possible to the initial motion model 122 at discrete steps over the entire duration T:

$$E_{data}(t) = w_r \|r(t) - \bar{r}(t)\|^2 + w_\theta \|\theta(t) - \bar{\theta}(t)\|^2 + w_p \sum_{i=1}^{4} \|p_i(t) - \bar{p}_i(t)\|^2 \quad (1)$$

$$E_{dur} = w_d \sum_{i=1}^{4} \sum_{j=1}^{n_i} (T_{i,j} - \bar{T}_{i,j})^2 \quad (2)$$

The weight terms can be set, for example, as $w_d=0.1$, $w_r=0.4$, $w_\theta=1.7$, $w_p=0.3$. The remaining objective terms are regularizers that prefer small velocities and accelerations:

$$E_{vel}(t) = \gamma_r \|\dot{r}(t)\|^2 + \gamma_\theta \|\dot{\theta}(t)\|^2 + \gamma_p \sum_{i=1}^{4} \|\dot{p}_i(t)\|^2 \quad (3)$$

$$E_{acc}(t) = \beta_r \|\ddot{r}(t)\|^2 + \beta_\theta \|\ddot{\theta}(t)\|^2 + \beta_p \sum_{i=1}^{4} \|\ddot{p}_i(t)\|^2 \quad (4)$$

These terms are calculated with finite differences. The parameters in these terms can be set, for example, as $\gamma_r=\gamma_\theta=10^{-3}$, $\gamma_p=0.1$ and $\beta_r=\beta_\theta=\beta_p=10^{-4}$.

The optimization problem is solved under a set of plausibility constraints. The first group of constraints strictly enforce valid rigid mechanics, including linear and angular momentum. This enforces physical properties of the motion. For example, during flight, the COM must follow a parabolic arc according to Newton's Second Law. During the contact, the body motion acceleration is limited by the possible contact forces e.g., one cannot walk at a 45° lean.

At each time step, the world-frame inertia tensor $I_w(t)$ is computed from the input $I_b(t)$ and the current orientation $\theta(t)$. The assumption here is that the final output poses will not be dramatically different from those of the input, which is a reasonable assumption since the optimization in this example does not operate on upper-body joint points and changes in feet positioning are typically small (but perceptually important). The gravity vector is $g=-9.8 \hat{n}$, where $\hat{n}$ is the ground normal. The angular velocity w is a function of the rotations $\theta$.

The contact forces are constrained to ensure that they push away from the floor but are not greater than $f_{max}$ (e.g., 1000 N) in the normal direction. Forces must also remain in a friction pyramid defined by friction coefficient $\mu$ and floor plane tangents $\hat{t}_1$, $\hat{t}_2$. Further, forces should be zero at any foot joint not in contact. Foot contact is enforced through constraints. When a foot joint is in contact, it should be stationary (no-slip) and at floor height $h_{floor}$. When not in contact, feet should always be on or above the ground plane.

In order to make the optimized motion valid for a humanoid skeleton, the toe and heel of each foot should maintain a constant distance of $l_{foot}$. Further, no foot joint points should be father from its corresponding hip than the length of the leg $l_{leg}$. The hip position $p_{hip,i}(t)$ can be computed from the COM orientation at that time based on the hip offset in the skeleton.

The above model refinement optimization problem can be solved using existing methods, such as a nonlinear interior point optimizer, using analytical derivatives. The optimization can be performed in stages. For example, the optimization can be first performed with fixed contact phases and no dynamics constraints to fit the polynomial representation for the COM and feet position variables as close as possible to the input motion. Next, dynamics constraints can be added to find a physically valid motion, and finally, contact phase durations can be optimized to further refine the motion. The obtained optimized COM position r(t) and foot joint point positions $p_i(t)$ can be utilized to compute full-body motion. For example, the motion model refinement system 104 can use inverse kinematics (IK) to compute the full-body motion on a target skeleton based on the COM position r(t) and foot joint point positions $p_i(t)$.

At block 210, the process 200 involves applying the refined motion model 124 to the target computer-generated character using any computer animation technologies known in the art. In some examples, the joints or other characteristics of the target computer-generated character have been taken into account when the optimization is performed, such as through the re-targeted initial motion model 412 generated by the character retargeting module 408 based on the target computer-generated character.

Figure 5:
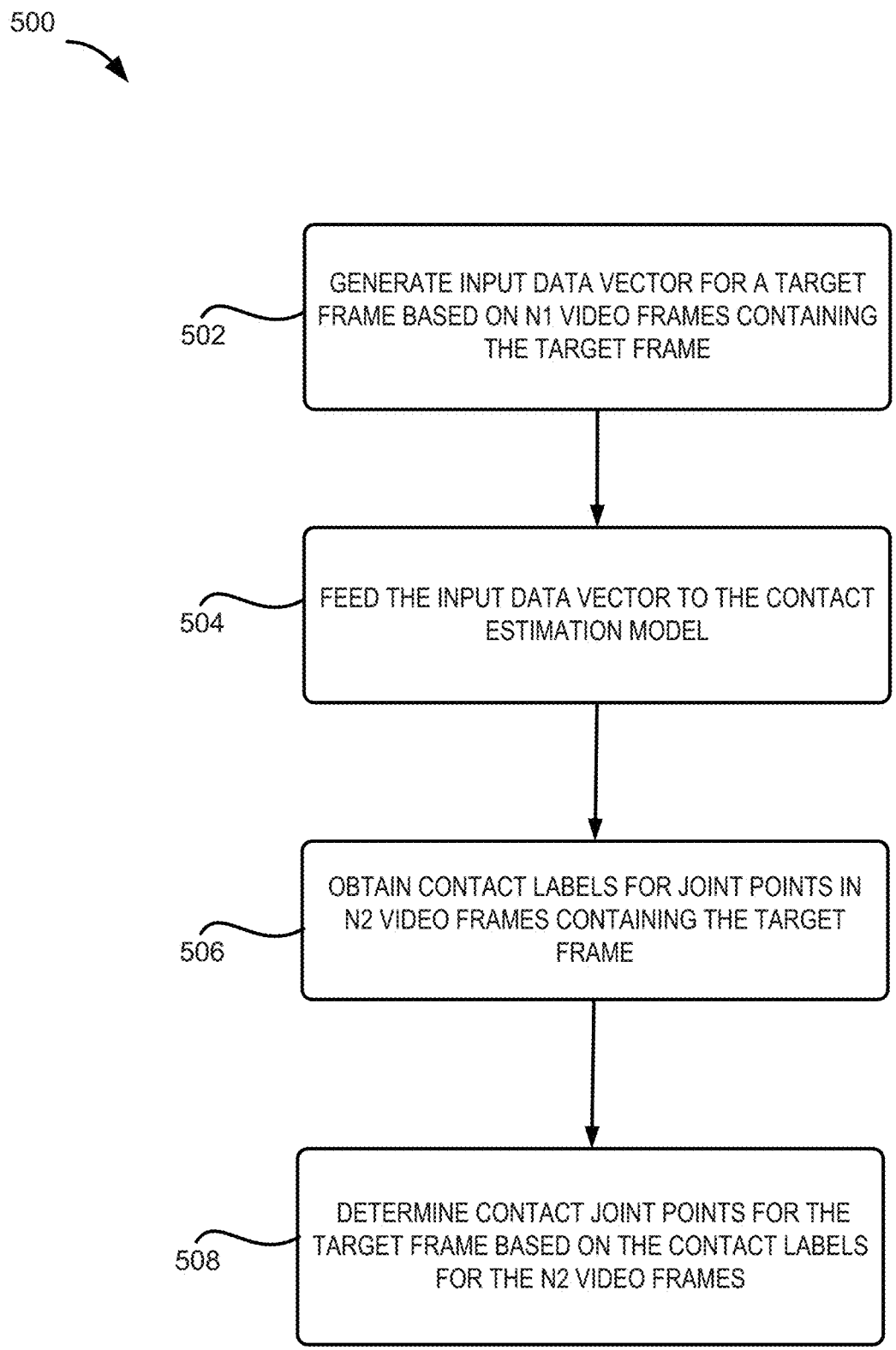
FIG. 5 depicts an example of a process for estimating contact joint points of a human character in a target video frame, according to certain embodiments of the present disclosure.

FIG. 5 illustrates an example of a process 500 for estimating contact joint points of a human character in a target video frame, according to certain embodiments of the present disclosure. One or more computing devices (e.g., the computing system 102) implement operations depicted in FIG. 5 by executing suitable program code). For illustrative purposes, the process 500 is described with reference to certain examples depicted in the figures. Other implementations, however, are possible.

At block 502, the process 500 involves generating input data vector for a target video frame to input to the contact estimation model 118. In some examples, the contact estimation model 118 is configured to accept an input data vector containing K lower body joint points of the character in N1 video frames surrounding the target video frame. The lower body joint points can be determined from the 2D pose joint points 404 (or the joint points 126) extracted from each frame of the video sequence. For example, if N1 is set to 9, the video frames used to generate the input vector can include the target frame, 4 frames before the target frame, and 4 frames after the target frame. In the example skeleton shown in FIG. 3, nine joint points (points 8-13, 18-20) are lower body joint points of the character and are used to generate the input data vector. The positions (x, y) of the lower body joint points in each frame of the N1 frames can be included in the input data vector. In further examples, the input data vector can also include the confidence value, c, of the respective joint points. The confidence values can be obtained from the 2D pose estimation module 402 if the 2D pose estimation module 402 is employed to generate the 2D pose joint points 404. As a result, the input data vector can include (x, y, c) for each joint point of the K lower body joint points in the N1 frames which leads to a 3×K×N1 input vector.

At block 504, the process 200 involves feeding the input data vector to the contact estimation model 118. At block 506, the process involves obtaining contact labels for the foot joint points of the character. The contact labels indicate whether the corresponding foot joint points are in contact with the ground or not. In some implementations, the contact estimation model 118 is configured to output the contact labels for the target video frame. In other implementations, the contact estimation model 118 is configured to output the contact labels for N2 frames surrounding the target frame, such as the target frame and two frames before the target frame and two frames after the target frame. In these implementations, the outputs of the contact estimation model 118 include 4×N2 contact labels.

At block 508, the process 200 involves determining the final contact labels for the foot joint points in the target frame. If the contact labels for multiple frames are generated for each prediction, the final contact labels can be determined through majority voting among the multiple predicted contact labels for each foot joint point. The contact label for a foot joint point can be a binary value with "1" indicating the foot joint point is in contact with the ground and "0" indicating no contact. The contact label can also be a real number between 0 and 1 indicating the likelihood of the corresponding foot joint point is in contact with the ground. Whether the foot joint point is in contact with the ground can be determined by comparing the confidence value with a threshold value of confidence.

Examples of Processes for Training Contact Estimation Model

Figure 6:
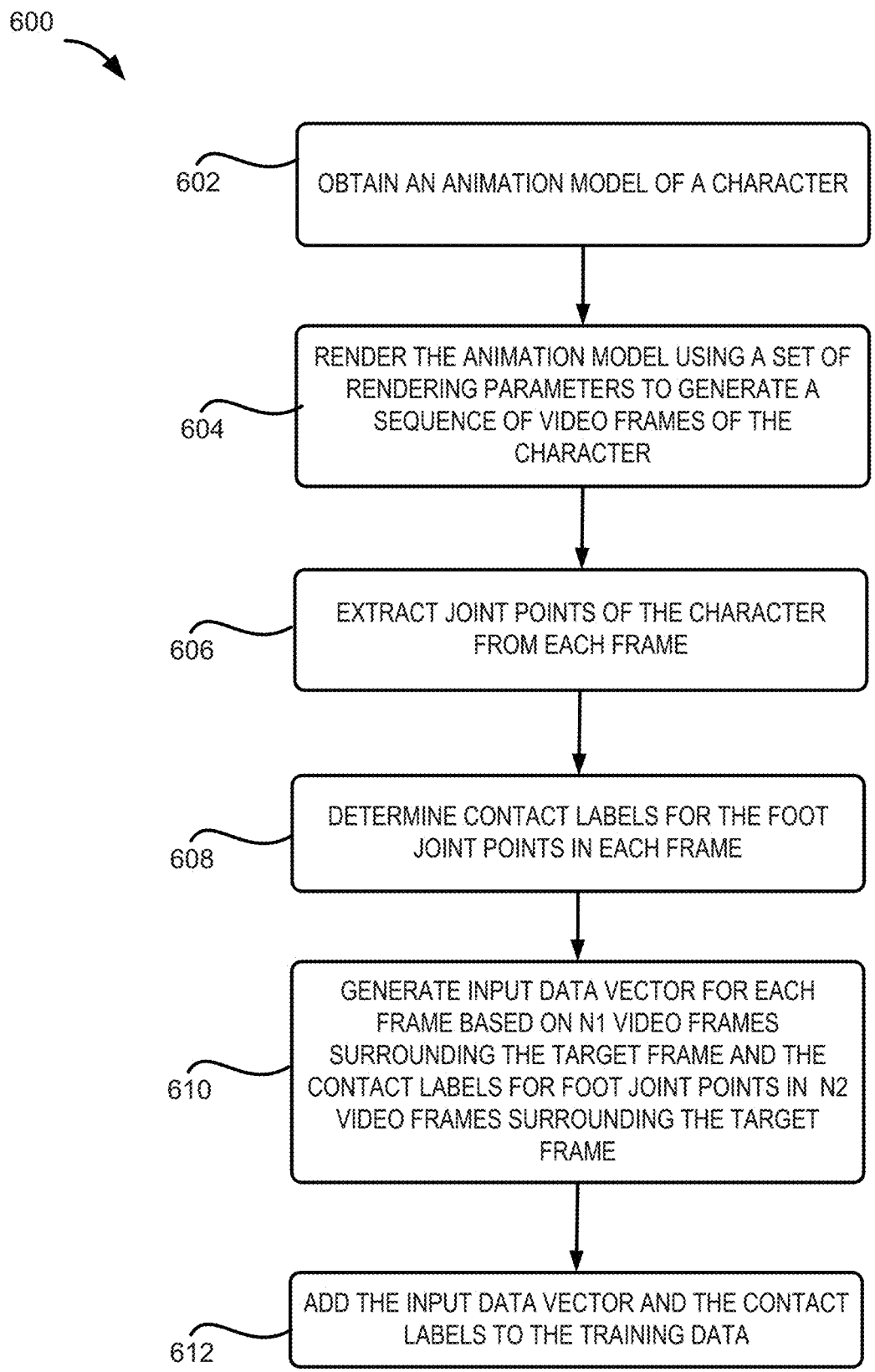
FIG. 6 depicts an example of a process for generating training data for a contact estimation model, according to certain embodiments of the present disclosure.

To train the contact estimation model 118, the training data 112 need to be obtained. FIG. 6 shows an example of a process for generating training data 112 for the contact estimation model 118, according to certain embodiments of the present disclosure. One or more computing devices (e.g., the computing system 102) implement operations depicted in FIG. 6 by executing suitable program code (e.g., the model training system 106). For illustrative purposes, process 600 is described with reference to certain examples depicted in the figures. Other implementations, however, are possible.

At block 602, the process 600 involves obtaining an animation model of a character. The motion of the character can be selected from different types of motions and the character can be selected from different types of characters. The animation model can be obtained, for example, from www.mixamo.com developed by MIXAMO INC. from San Francisco, Calif. USA. At block 604, the process 600 involves rendering the animation model using a set of rendering parameters to generate a sequence of video frames of the character. The rendering parameters can include, for example, a motion blur parameter for setting the motion blur of the rendered sequence, a lighting parameter for setting the lighting conditions of the rendering, and a floor texture parameter for selecting the floor texture of the rendered sequence. The rendered sequence can be generated by rendering the animation model with the rendering parameters from a randomly selected camera viewpoint. In some examples, multiple camera viewpoints can be randomly selected for rendering multiple sequences. The remaining operations can be performed for each of the rendered sequences to generate the training data.

At block 606, the process 600 involves extracting joint points of the character in each frame of the rendered sequence. The joint points can be extracted using the 2D pose estimation module 402 as described above. Each of the extracted joint points can have a location (x, y) and a confidence value c associated therewith. At block 608, the process 600 involves determining contact labels for the foot joint points of the character in each frame. At each video frame, four possible contacts are automatically labeled by a heuristic: a toe or heel joint point is considered to be in contact with the ground if (1) it has moved less than a distance x from the previous frame or time, and (2) it is within a distance y from the known ground plane. In some examples, x=2 cm and y=5 cm. In some examples, this heuristic contact labeling is performed based on the 3D joint motion which is known from the character animation. These contact labels are determined in 3D, and then applied to the corresponding 2D joints in the dataset.

At block 610, the process 600 involves generating the input data vector for each frame. As described above, in some examples, the contact estimation model 118 is configured to use the lower-body joint points of the character in N1 video frames surrounding the target frame as the input. As such, the input data vector can include 3×K×N1 values which include the positions and confidence value (x, y, c) for each joint point of the K lower body joint points in the N1 frames. In some examples, the 2D joint positions in the N1 input video frames are normalized to place the root position of the target frame at the location (0,0) so that the contact estimation model 118 considers the relative position and velocity. The output value can include the contact labels for the target frame or N2 video frames surrounding the target frame depending on the structure of the contact estimation model 118. At block 612, the process 600 involves adding the input data vector and the corresponding contact labels to the training data.

The process 600 can be performed for different animation models (e.g., animation models ranging from dynamic dancing motions to idling) and a variety of animated characters to generate the training data 112. The generated training data can be utilized to train the contact estimation model 118. In some configurations, the contact estimation model 118 is a neural network built with a five-layer multilayer perceptron (MLP) with rectified linear non-linearity (ReLU) non-linearities and each layer except for the last layer is followed by batch normalization. A single dropout layer (e.g., drop p=0.3) is utilized. The input layer of the contact estimation model 118 is configured for receiving the input vector and the output layer is configured for outputting, for each foot joint point of the character in the N2 video frames, the contact label indicating the contact status of the joint point with the ground plane. The training of the contact estimation model 118 can be performed by using 80%, 10% and 10% of the training data for training, validation, and test, respectively. In some examples, the splitting of the training data is performed such that no motion will be in both training and testing datasets, but a training motion may appear in the testing dataset retargeted onto a different character. The contact estimation model 118 can be trained using a standard binary cross-entropy loss.

Note that although the above description focuses on a human character, the technology presented herein applies to any type of character. Further, the contact analysis for foot joint points described above can be extended to other joint points for improving the motion models. For example, knee joint points (such as the knee joint points 9 and 12) can be analyzed to determine their contact with the ground and be used in the motion model refinement to eliminate implausibility associated with the knees of a character. Likewise, the contact analysis can be performed with respect to other surfaces instead of or in addition to the ground, such as a wall. Proper constraints can be introduced in the optimization process for the contact of joint points with these surfaces to reduce the visual artifacts associated with these surfaces and joint points.

Figure 7:
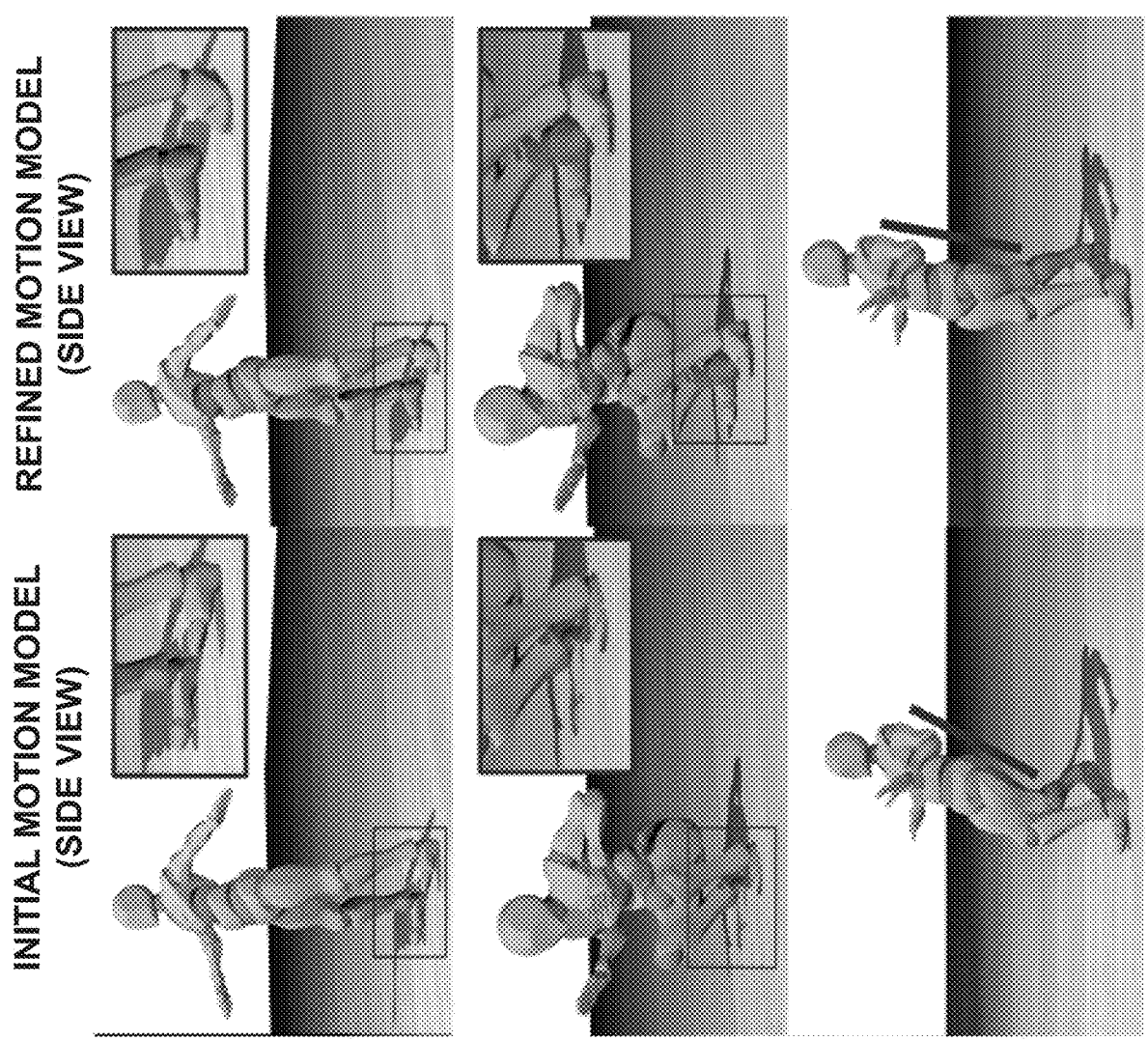
FIG. 7 depicts examples of initial motion models and the refined motion models for different characters, according to certain embodiments of the present disclosure.

FIG. 7 depicts an example of an initial motion model and the refined motion model for different characters, according to certain embodiments of the present disclosure. In the examples shown in FIG. 7, the left and right columns show the corresponding side views of the initial motion model 122 and refined motion model 124, respectively. From FIG. 7, it can be observed that the refined motion models 124 corrected the implausible artifacts in the corresponding initial motion models 122, such as foot floating (top row), foot penetrations (middle), and unnatural leaning (bottom).

Figure 8:
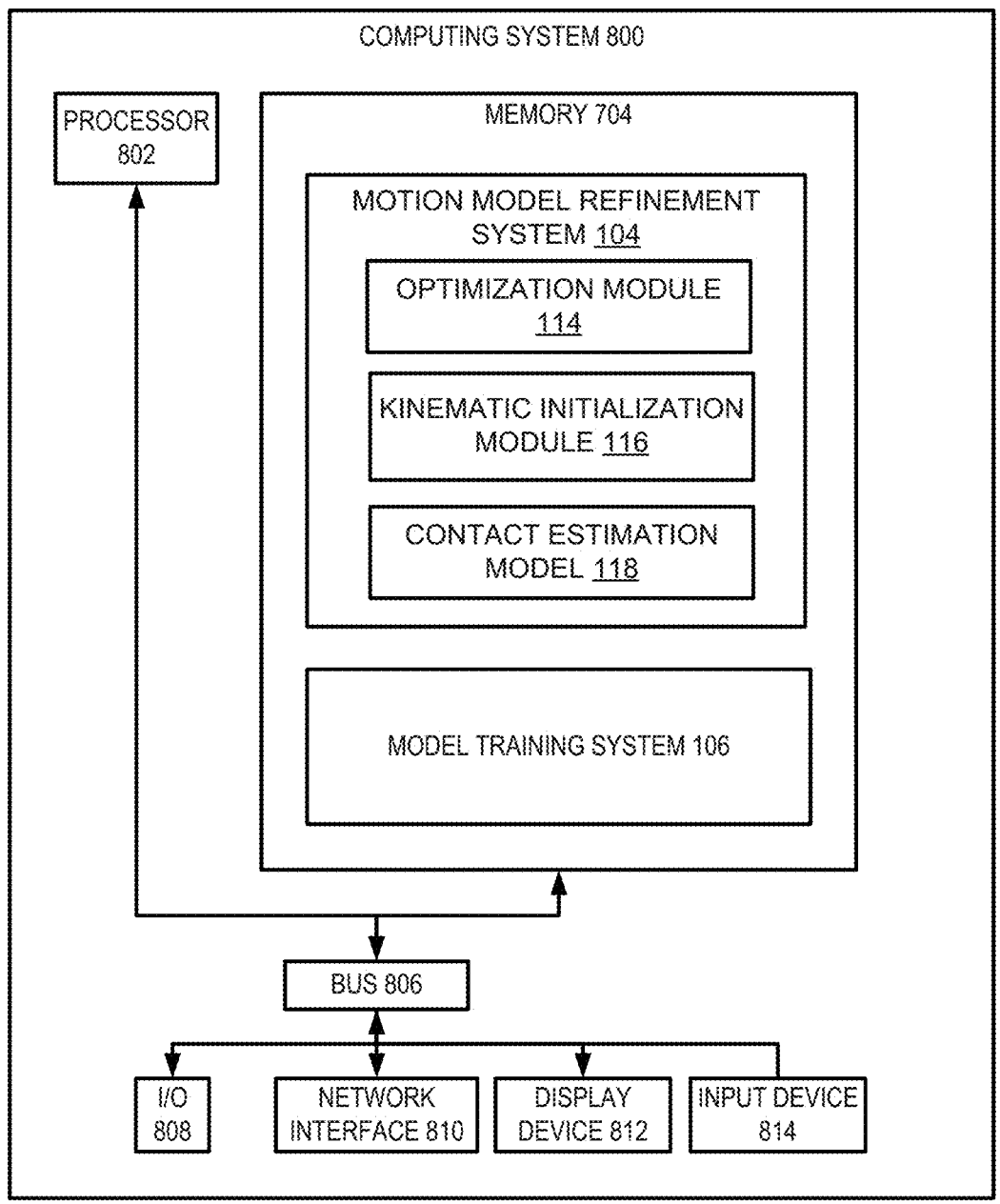
FIG. 8 depicts an example of a computing system that executes a motion model refinement system for performing certain embodiments of the present disclosure.

Computing System Example for Implementing Motion Model Refinement Based on Contact Analysis and Physics-Based Optimization Any suitable computing system or group of computing systems can be used for performing the operations described herein. For example, FIG. 8 depicts an example of a computing system 800 that can implement the computing environment of FIG. 1. In some embodiments, the computing system 800 includes a processing device 802 that executes the motion model refinement system 104, a model training system 106, or a combination of both, a memory that stores various data computed or used by the motion model refinement system 104 or the model training system 106, an input device 814 (e.g., a mouse, a stylus, a touchpad, a touchscreen, etc.), and a display device 812 that displays graphical content generated by the motion model refinement system 104. For illustrative purposes, FIG. 8 depicts a single computing system on which the motion model refinement system 104 or the model training system 106 is executed, and the input device 814 and display device 812 are present. But these applications, datasets, and devices can be stored or included across different computing systems having devices similar to the devices depicted in FIG. 8.

The depicted example of a computing system 800 includes a processing device 802 communicatively coupled to one or more memory devices 804. The processing device 802 executes computer-executable program code stored in a memory device 804, accesses information stored in the memory device 804, or both. Examples of the processing device 802 include a microprocessor, an application-specific integrated circuit ("ASIC"), a field-programmable gate array ("FPGA"), or any other suitable processing device. The processing device 802 can include any number of processing devices, including a single processing device.

The memory device 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 800 may also include a number of external or internal devices, such as an input device 814, a display device 812, or other input or output devices. For example, the computing system 800 is shown with one or more input/output ("I/O") interfaces 808. An I/O interface 808 can receive input from input devices or provide output to output devices. One or more buses 806 are also included in the computing system 800. The buses 806 communicatively couples one or more components of a respective one of the computing system 800.

The computing system 800 executes program code that configures the processing device 802 to perform one or more of the operations described herein. The program code includes, for example, the motion model refinement system 104, the model training system 106 or other suitable applications that perform one or more operations described herein. The program code may be resident in the memory device 804 or any suitable computer-readable medium and may be executed by the processing device 802 or any other suitable processor. In some embodiments, all modules in the motion model refinement system 104 (e.g., the optimization module 114, the kinematic initialization module 116, the contact estimation model 118, etc.) are stored in the memory device 804, as depicted in FIG. 8. In additional or alternative embodiments, one or more of these modules from the motion model refinement system 104 are stored in different memory devices of different computing systems.

In some embodiments, the computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and/or the like. The computing system 800 is able to communicate with one or more other computing devices (e.g., a computing device that receives inputs for the motion model refinement system 104 or displays outputs of the motion model refinement system 104) via a data network using the network interface device 810.

An input device 814 can include any device or group of devices suitable for receiving visual, auditory, or other suitable input that controls or affects the operations of the processing device 802. Non-limiting examples of the input device 814 include a touchscreen, stylus, a mouse, a keyboard, a microphone, a separate mobile computing device, etc. A display device 812 can include any device or group of devices suitable for providing visual, auditory, or other suitable sensory output. Non-limiting examples of the display device 812 include a touchscreen, a monitor, a separate mobile computing device, etc.

Although FIG. 8 depicts the input device 814 and the display device 812 as being local to the computing device that executes the motion model refinement system 104, other implementations are possible. For instance, in some embodiments, one or more of the input device 814 and the display device 812 can include a remote client-computing device that communicates with the computing system 800 via the network interface device 810 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method in which one or more processing devices perform operations comprising:
    determining contact joint points for a human character contained in a sequence of video frames using a trained contact estimation model, wherein the contact joint points are determined by the trained contact estimation model as being in contact with a ground plane;
    determining the ground plane, in a three-dimensional space defined by an initial motion model of the human character, based on the contact joint points and the initial motion model, wherein the initial motion model of the human character is estimated from the sequence of video frames and describes motions of joint points of the human character in the three-dimensional space;
    determining a refined motion model over the initial motion model by performing an optimization under a set of constraints defined based on the initial motion model, the determined ground plane, and the contact joint points; and
    applying the refined motion model on a target computer-generated character.

2. The computer-implemented method of claim 1, wherein performing the optimization comprises minimizing a difference between the refined motion model and the initial motion model, and wherein the set of constraints comprise one or more of a time-dependent inertia tensor-based constraint, a leg-length constraint, a foot-length constraint, or constraints on the contact joint points.

3. The computer-implemented method of claim 1, wherein performing the optimization comprises determining a position of a center of mass (COM) of the human character.

4. The computer-implemented method of claim 1, further comprising, prior to performing the optimization, smoothing the motions of the joint points in the initial motion model along a time dimension by applying a low-pass filter on the joint points of the initial motion model over time.

5. The computer-implemented method of claim 1, further comprising:
    prior to performing the optimization, re-targeting the initial motion model on the target computer-generated character to generate a re-targeted initial motion model, wherein the refined motion model is generated by performing the optimization based on the re-targeted initial motion model.

6. The computer-implemented method of claim 1, wherein the contact joint points comprise contact foot joint points, and wherein the trained contact estimation model is configured to determine, based on at least a portion of joint points of the human character, a contact label for each of foot joint points of the human character, the contact label indicating whether an associated joint point is in contact with the ground plane or not.

7. The computer-implemented method of claim 6, wherein the foot joint points comprise a left heel joint point, a left toe joint point, a right heel joint point, and a right toe joint point, and wherein the portion of joint points used for determining the contact labels comprise joint points on a lower body of the human character.

8. A system comprising:
    a processing device; and
    a non-transitory computer-readable medium having program code that is stored thereon, the program code executable by the processing device for performing operations, comprising:

generating an input vector for a sequence of video frames by determining positions of joint points of a character contained in the sequence of video frames;

executing a trained neural network based on the input vector to generate indications of contact statuses of a subset of the joint points with a ground plane;

estimating the ground plane in a three-dimensional space based on joint points that are in contact with the ground plane according to the indications of the contact statuses and an initial motion model of the character in the three-dimensional space extracted from the sequence of video frames;

determining a refined motion model based on the initial motion model by performing an optimization under a set of constraints; and applying the refined motion model on a target computer-generated character to generate a computer animated character.

9. The system of claim 8, wherein the joint points of the character comprise joint points of a lower body of the character, and wherein the subset of the joint points comprise a joint point of a left toe of the character, a joint point of a left heel of the character, a joint point of a right toe of the character, and a joint point of a right heel of the character.

10. The system of claim 8, wherein the trained neural network comprises:

an input layer configured for receiving an input vector containing positions of joint points of a character contained in a first set of video frames; and an output layer configured for outputting, for each joint point in a subset of the joint points of the character in a second set of video frames, an indication of a contact status of the joint point with a ground plane, wherein the first set of video frames comprises the second set of video frames.

11. The system of claim 8, wherein performing the optimization comprises minimizing a difference between the refined motion model and the initial motion model, and wherein the set of constraints comprise one or more of a time-dependent inertia tensor-based constraint, a leg-length constraint, a foot-length constraint, or constraints on the subset of the joint points based on their respective contact statuses.

12. The system of claim 8, wherein performing the optimization comprises determining a position of a center of mass (COM) of the character and positions of the subset of the joint points in the refined motion model.

13. The system of claim 8, wherein the character is a human character.

14. A non-transitory computer-readable medium having program code that is stored thereon, the program code executable by one or more processing devices for performing operations comprising:

determining contact joint points for a human character contained in a sequence of video frames using a trained contact estimation model, wherein the contact joint points are determined by the trained contact estimation model as being in contact with a ground plane;

determining the ground plane, in a three-dimensional space defined by an initial motion model of the human character, based on the contact joint points and the initial motion model, wherein the initial motion model of the human character is estimated from the sequence of video frames and describes motions of joint points of the human character in the three-dimensional space;

determining a refined motion model over the initial motion model by performing an optimization under a set of constraints defined based on the initial motion model, the determined ground plane, and the contact joint points; and applying the refined motion model on a target computer-generated character.

15. The non-transitory computer-readable medium of claim 14, wherein performing the optimization comprises minimizing a difference between the refined motion model and the initial motion model, and wherein the set of constraints comprise one or more of a time-dependent inertia tensor-based constraint, a leg-length constraint, a foot-length constraint, or constraints on the contact joint points.

16. The non-transitory computer-readable medium of claim 14, wherein performing the optimization comprises determining a position of a center of mass (COM) of the human character.

17. The non-transitory computer-readable medium of claim 14, wherein the operations further comprise, prior to performing the optimization, smoothing the motions of the joint points in the initial motion model along a time dimension by applying a low-pass filter on the joint points of the initial motion model over time.

18. The non-transitory computer-readable medium of claim 14, wherein the operations further comprise:

prior to performing the optimization, re-targeting the initial motion model on the target computer-generated character to generate a re-targeted initial motion model, wherein the refined motion model is generated by performing the optimization based on the re-targeted initial motion model.

19. The non-transitory computer-readable medium of claim 14, wherein the contact joint points comprise contact foot joint points, and wherein the trained contact estimation model is configured to determine, based on at least a portion of joint points of the human character, a contact label for each of foot joint points of the human character, the contact label indicating whether an associated joint point is in contact with the ground plane or not.

20. The non-transitory computer-readable medium of claim 19, wherein the foot joint points comprise a left heel joint point, a left toe joint point, a right heel joint point, and a right toe joint point, and wherein the portion of joint points used for determining the contact labels comprise joint points on a lower body of the human character.

* * * * *